United States Patent [19]

Carpenter et al.

[11] Patent Number: 4,929,265
[45] Date of Patent: May 29, 1990

[54] METHOD OF MOLDING GLASS OPTICAL ELEMENTS

[75] Inventors: Larry L. Carpenter; Robert J. Hagerty, both of Painted Post; Richard O. Maschmeyer, Corning; Mark L. Morrell, Horseheads; Peter A. Schrauth, Elmira, all of N.Y.

[73] Assignee: Corning Incorporated, Corning, N.Y.

[21] Appl. No.: 320,459

[22] Filed: Mar. 8, 1989

[51] Int. Cl.⁵ .............................. C03B 23/00
[52] U.S. Cl. ............................ 65/64; 65/104; 65/102; 65/275; 65/319; 264/2.7; 425/808
[58] Field of Search ............... 65/26, 64, 102, 104, 65/275, 319; 425/808; 264/2.7

[56] References Cited

U.S. PATENT DOCUMENTS

| | | | |
|---|---|---|---|
| 2,253,697 | 8/1941 | Genesy | 65/319 X |
| 2,410,616 | 11/1946 | Webbs | 65/157 |
| 3,244,497 | 4/1966 | Copeland | 65/308 |
| 3,833,347 | 9/1974 | Angle et al. | 65/32 |
| 3,844,755 | 10/1974 | Angle et al. | 65/32 |
| 3,900,328 | 8/1975 | Parsons et al. | 106/39.5 |
| 4,073,654 | 2/1978 | Wu | 106/52 |
| 4,139,677 | 2/1979 | Blair et al. | 65/32 |
| 4,168,961 | 9/1979 | Blair | 65/66 |
| 4,362,819 | 12/1982 | Olszewski et al. | 65/134 |
| 4,447,550 | 5/1984 | Leroy et al. | 501/75 |
| 4,481,023 | 11/1985 | Marechal-Maschmeyer | 65/64 |
| 4,629,489 | 12/1986 | Hirota et al. | 65/104 X |
| 4,734,118 | 3/1988 | Marechal et al. | 65/102 |
| 4,747,864 | 5/1988 | Hagerty et al. | 65/102 |

FOREIGN PATENT DOCUMENTS

19342 of 0000 European Pat. Off. .

Primary Examiner—Arthur Kellogg
Attorney, Agent, or Firm—Burton R. Turner; Walter S. Zebrowski

[57] ABSTRACT

A method of molding precision glass optical elements or lenses is disclosed. Precision molded glass molds are first provided which define a glass mold cavity having a predetermined desired size, shape and volume corresponding to the glass optical element. To facilitate formation of the glass optical elements, shaped and polished preforms are formed.

40 Claims, 1 Drawing Sheet

METHOD OF MOLDING GLASS OPTICAL ELEMENTS

CROSS REFERENCE TO RELATED APPLICATIONS

This application is related in part to U.S. Pat. No. 4,481,023, issued to Marechal and Maschmeyer on Nov. 6, 1984, assigned to the assignee of the present invention, and incorporated herein by reference.

This application is also related to the following copending applications filed concurrently herewith, each of which are assigned to the assignee of the present application, and incorporated herein by reference:

"Method of Forming a Precision Glass Mold and Article", by L. L. Carpenter, R. J. Hagerty, M. L. Morrell and P. A. Schrauth, Ser. No. 320,754, Filed Mar. 8, 1989;

"Apparatus for Molding Glass Optical Elements", by L. L. Carpenter, M. L. Morrell and P. A. Schrauth, Ser. No. 320,753, Filed Mar. 8, 1989; and "Apparatus for Molding Glass Molds", L. L. Carpenter, M. L. Morrell and P. A. Schrauth, Ser. No. 320,693, Filed Mar. 8, 1989.

BACKGROUND OF THE INVENTION

Manufacture of optical lens elements has long involved complex, slow, expensive and tedious procedures. Although concerted efforts to improve existing methods and apparatus of manufacture have been undertaken, prior art methods still have many disadvantages and problems.

Precision optical elements require polished surfaces of exacting figure and surface quality. The surfaces demand fabrication in proper geometric relation to each other and, where the elements are used in transmission applications, they will be prepared from a material of controlled, uniform, and isotropic refractive index. For some applications non-isotropic refractive index materials have been known.

Precision optical elements of glass are customarily produced by means of one of two complex, multi-step processes. In one process, a glass batch is melted in a conventional manner and the melt formed into a glass body having a controlled and homogeneous refractive index. Thereafter, the body may be reformed utilizing well-known repressing techniques to yield a shape approximating that of the desired final article. The surface figure and finish of such an intermediate product are not suitable for image forming optics. The intermediate article is fine annealed to develop the proper refractive index, and the surface figure thereof is improved by means of conventional grinding practices. Another method involves forming a glass melt into a bulk body which is promptly fine annealed and subsequently cut and ground to articles of a desired configuration.

Both of the preceding processes have similar limitations. The surface profiles that are produced through grinding are normally restricted to conic sections, such as flats, spheres, and parabolas. It should be understood that other shapes, in particular, general aspheric surfaces are difficult to grind. In both processes, the ground optical surfaces are polished employing conventional, but complicated polishing techniques which are intended to improve surface finish without compromising the surface figure. In the case of the aspheric surfaces, such polishing requires highly skilled and very expensive hand-working. A final finishing operation, such as, for example, edging is also commonly required. Edging ensures that the optical and mechanical axes of a spherical lens coincide. Edging, however, does not improve the relationship of misaligned aspheric surfaces, if such are present, which factor accounts, at least in part, for the difficulty experienced in grinding such lenses with precision.

Direct molding of lenses to a finished state could, at least in principle, eliminate the grinding, polishing and edging operations, which are especially difficult and time consuming for aspheric lenses. Such molding processes are employed for fabricating plastic lenses. However, existing plastics suitable for optical applications are available in a limited refractive index and dispersion range. In addition, many plastics scratch easily, display birefringence and are prone to the development of yellowing and haze. Abrasion resistant and anti-reflective coatings have been used but have failed to fully solve these problems with plastics. Further, plastic optical elements are subject to distortion from mechanical forces, humidity, and heat. Both the volume and refractive index of plastics vary substantially with variations in temperature thereby limiting the temperature interval over which plastics are useful.

The properties of glass render it generally superior to plastic for optical applications. Conventional hot pressing of glass, however, does not provide the exacting surface figures and surface qualities demanded for image forming optics. The presence of chill wrinkles in the surface and surface figure deviations are chronic problems. Similar problems can be encountered in conventional repressing techniques as noted above.

Numerous means and devices have been employed to correct the shortcomings of conventional hot glass pressing processes and apparatuses. Among these are special pressing apparatuses utilizing isothermal pressing, i.e., pressing using heated molds and preheated glass so that the temperatures under which the pressing step is carried out vary only slightly across the glass preform during the pressing interval, and using a gaseous environment inert to the glass and mold materials during the pressing operation. In addition, special materials to construct the molds, special glass compositions and molding process parameters have been developed and used in an effort to improve the quality of lenses as well as other optical elements which are directly pressed.

Various patents related to mold and glass manufacture are noted and described below, and all of these patents are hereby expressly incorporated herein by reference. U.S. Pat. No. 2,410,616 describes an early apparatus and method for molding glass lenses. The molds are capable of being heated and the temperatures thereof controlled within narrow ranges compatible which the glasses being molded. An inert or reducing gas environment, preferably hydrogen, is used in contact with the mold surfaces to inhibit oxidation thereof. A flame curtain, normally burning hydrogen, over the opening of a chamber enclosing the molds to prevent the entrance of air thereinto is described.

U.S. Pat. No. 3,833,347 is similarly directed to an apparatus and method for press molding glass lenses. The molds can be heated and the temperature controlled. An inert gas surrounds the molds to preclude oxidation. This patent discloses the use of mold surfaces composed of glass-like carbon which are distinguished from metal dies that were stated to produce lens surfaces not suitable for photographic applications. The method described comprises eight steps including placing a chunk of glass into a mold, evacuating the chamber surrounding the mold and introducing a gas therein, raising the mold temperature to about the softening point of the glass, applying a load to the mold to shape the glass, reducing the temperature of the mold to below the transformation temperature of the glass while maintaining the load on the mold to prevent distortion of the shaped glass body, removing the load, cooling the mold to about 300° C. to inhibit oxidation of the glass-like carbon, and lastly opening the mold. This patent asserted that lenses so produced were essentially strain-free without the need for further annealing.

A similar teaching of an apparatus and method for transfer molding glass lenses employing glass-like carbon surfaces on the mold is found in U.S. Pat. No. 3,844,755. The use of mold coatings to enhance the surface quality of the pressings, to improve mold durability, and act as a parting agent from the molten glass is suggested in U.S. Pat. No. 3,244,497. This patent describes a lens blank molding apparatus wherein a temperature controlled plunger and an insulated mold base offering controllable heat transfer to a supporting press table are described. The apparatus, however, is designed for pressing relatively thin lens blanks, which factor is an important contributor to the temperature control attainable with the apparatus. U.S. Pat. No. 4,481,023 describes an alternative molding apparatus for direct pressing of lenses of optical quality. Temperature control of the molding surfaces is also provided, and the apparatus is designed for pressing at relatively high glass viscosities of $10^8$–$10^{12}$ poises. This corresponds to a relatively low pressing temperature, which helps to reduce difficulties stemming from nonuniform heat flow.

U.S. Pat. No. 3,244,497, supra, teaches refractory coating selected from the group consisting of refractory nitrides, borides, carbides, and oxides. Coatings no thicker than approximately half of the wavelength of visible light, e.g. 0.5 microns, are suggested in order that the coating faithfully reproduce the mirror finish of the underlying mold surface.

U.S. Pat. No. 3,900,328 generally describes molding glass lenses utilizing molds fabricated from glass-like carbon. This reference discloses placing a portion of heat softened glass into a cavity of a mold prepared from glass-like carbon, applying appropriate amounts of heat and pressure to the mold while maintaining a non-oxidizing atmosphere in the vicinity of the mold, cooling and opening the mold, and then removing the finished lens from the mold.

U.S. Pat. No. 4,168,961 describes a method for precision molding of optical glass elements wherein a mold having mold surfaces of a silicone carbide/glassy carbon mixture is taught. The patent suggests that elements molded employing such mold material exhibit high surface quality and surface accuracy. However, molding while maintaining a controlled atmosphere is required to avoid oxidation of this material, a condition which substantially reduces the practical economical value of the method.

Press forming optical lenses from hydrated glass is taught in U.S. Pat. No. 4,073,654. The process involves placing granules of hydrated glass into a mold, drawing a vacuum on the mold, heating the mold to a sufficiently high temperature to sinter the granules while the mold is sealed to prevent escape of water vapor therefrom, applying a load to the mold, releasing the load from the mold, and opening the mold. Glass-like carbon, tungsten carbide, and alloys of tungsten are suggested mold materials.

European patent application No. 19342 discloses isothermal pressing of glass lenses at temperatures above the softening points of the glasses employed, i.e. at temperatures where the glasses exhibit viscosities of less than $10^{7.6}$ poises.

U.S. Pat. No. 4,139,677 teaches precision molding of optical glass elements in a mold having molding surfaces formed of silicon carbide or silicon nitride. This method allegedly provides good surface quality and configuration, however, it requires maintaining an oxygen-free atmosphere within the molding chamber to avoid oxidation of the mold coatings.

U.S. Pat. No. 4,747,864 describes glass optical elements formed by a direct molding process at glass viscosities in the range of $10^8$–$10^{12}$ poises. Selected moldable alkali aluminofluorophosphate optical glasses are pressed to an optical surface finish in air utilizing an optically smooth titanium nitride molding surface, the surface being provided, for example, as a surface coating on a stainless steel mold or on a nickel chromium alloy mold supporting an electroless nickel base coating.

U.S. Pat. 4,734,118 describes a mold for pressing a glass preform which has an overall geometry similar to the desired final lens. The top and bottom mold dies having mold cavities which match the configuration of the final lens. A glass preform is heated to the molding temperature while the mold parts are separately heated. The mold parts are brought together against a ring having a thickness which governs the thickness of the lens to be molded. The volume of glass that is put into the molding cavity is controlled by measuring its mass. The reference teaches a variety of mold surface materials such as 400 series stainless steels, electroless nickel, beryllium nickel alloys, tungsten carbide, alloys of noble metals such as platinum, rhodium and gold and fused silica. The patent teaches that the mold material itself is not critical but must be capable of accepting a good surface finish.

In order to realize the economic advantages of employing direct molding techniques for products such as aspheric lenses, factors relating to the service life of the molds employed for the pressing operation are most significant and must be taken into strict account. The machining of aspheric shapes in molds renders the molds relatively expensive, particularly since very hard and durable mold materials are generally required. This is especially true for molding processes involving low-temperature, high-viscosity molding, since higher molding stresses are involved.

Primary factors affecting mold life include chemical reactions occurring between the hot mold and the glass to be molded, and between the hot mold and the atmosphere. The latter factor is particularly significant when rapid production rates that prohibit cooling of the shaped lens in the mold are desired. Prior art approaches have suggested using a controlled atmosphere for molding to avoid oxidation or other degradation of the mold surfaces, however, such steps are inconsistent with rapid and economical optical element production.

The development of direct glass element molding has been substantially assisted by the discovery of new glass compositions which can be molded at relatively low pressing temperatures while not being subject to attack by moisture in the manner usual for soft glasses. U.S. Pat. No. 4,362,819 discloses examples of alkali aluminofluorophosphate glasses useful for such applications. However, pressing of such glasses at economical rates has been difficult because of limited compatibility between these glasses and conventional mold materials.

SUMMARY OF THE INVENTION

In view of the foregoing state of the art, it is an object of the present invention to provide a glass optical element construction and a method of molding glass optical elements which can be economically practiced and which provides quality optical elements.

It is a further object of this invention to provide a method and apparatus for molding precision optical elements embodying small optical radii.

It is another object of the present invention to provide an economic and reproducible optical element and lens construction and molding process useful for molding aspheric glass elements and lenses with accurate surface figure and good surface finish.

It is still another object of the present invention to provide an economic method for precision molding glass optical elements.

It is a still further object of this invention to provide a method for precision molding of glass optical lenses rapidly and economically.

Briefly, according to the present invention, a pair of glass molds defining first and second opposed optical molding surfaces are provided. A first master defining a first master cavity adapted to form a first glass mold is provided, within which cavity a quantity of glass mold material is disposed. The first glass mold is then molded having a first glass molding surface adapted to form a first optical surface. The process is repeated with a second master so as to form a second glass mold having a second glass molding surface adapted to form a second optical surface.

The first and second glass molds thus formed are disposed within constraining means in an opposed operative relationship such that the first and second glass molding surfaces, at least in part, define a glass mold cavity having a predetermined volume, size and shape. A predetermined quantity of glass optical element material is disposed within the glass mold cavity thus formed, and a glass optical element having first and second optical surfaces is molded.

Precision inserts or rings having predetermined desired physical characteristics may be employed in connection with defining the cavities for forming the first and second glass molds as well as the glass mold cavity. Similarly, a master sleeve and a glass optical element sleeve are employed as constraining means to define the cavities.

To facilitate the formation of the glass optical elements or lenses, shaped and polished preforms are formed, such as, for example, spherical balls, from which the optical glass elements are molded.

One glass mold formed in accordance with this invention and used for molding in conjunction with another mold formed of metal, glass ceramic or the like is also contemplated by this invention, as is the molding of non-glass optical elements or lenses.

These and additional objects, features and advantages of the present invention will become apparent to those skilled in the art from the following detailed description and the accompanying drawing, which is incorporated in and constitutes part of the present specification, on which, by way of example, only the preferred embodiments of this invention are illustrated.

DESCRIPTION OF THE PREFERRED EMBODIMENTS

It is to be noted that the drawings are illustrative and symbolic of the present invention, and there is no intention to indicate scale or relative proportions of the various elements shown therein.

Figures 1, 2, 3, 4, 5, 6, 7:
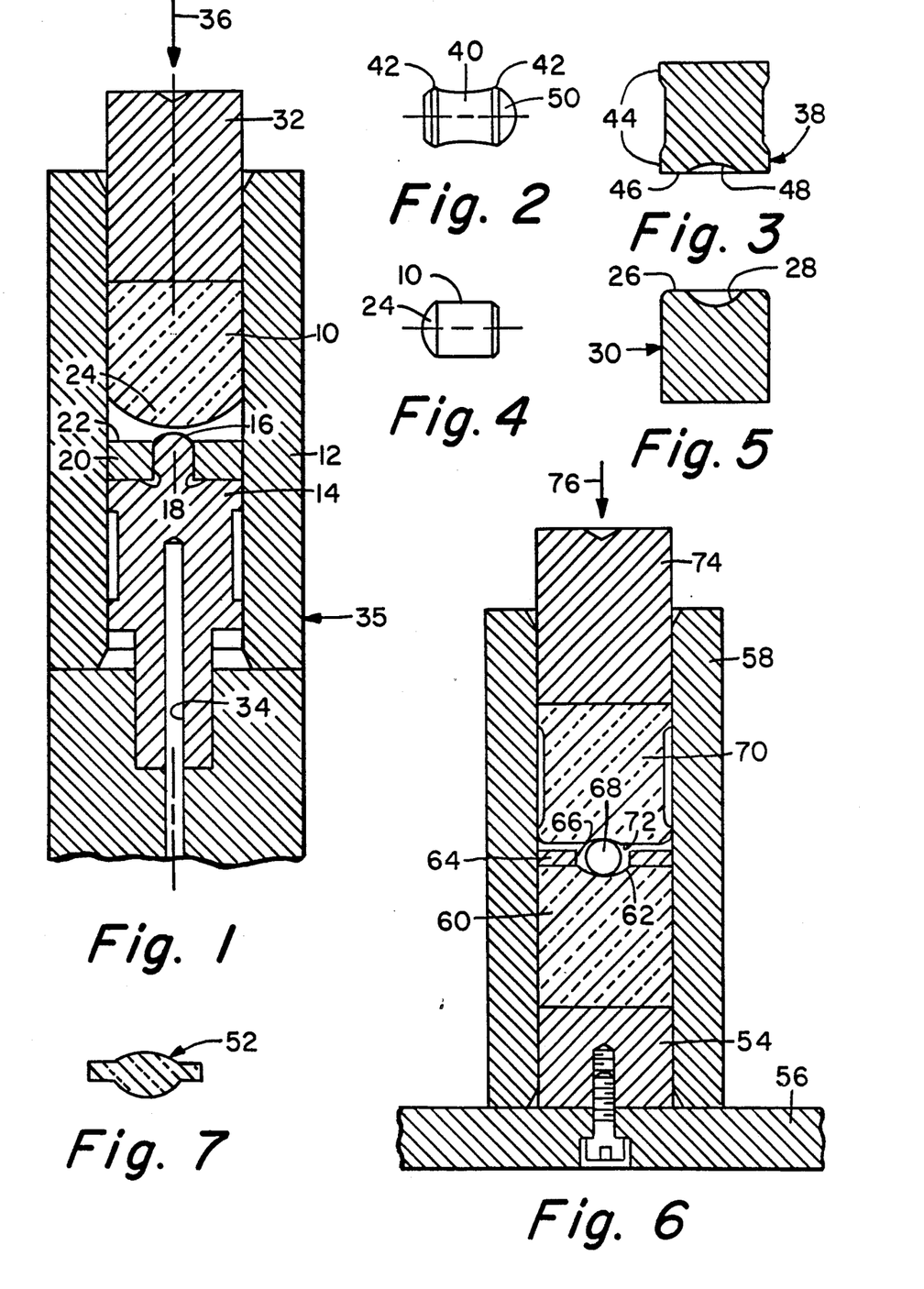
FIG. 1 is a cross-sectional elevation of an apparatus illustrating the method of forming a glass mold in accordance with the present invention.
FIG. 2 is an front elevation of a slug or preform suitable for forming one of the glass molds of the present invention.
FIG. 3 is a cross-sectional view of one of the glass molds formed in accordance with the present invention.
FIG. 4 is a front elevation of another slug or preform suitable for forming a glass mold in accordance with the present invention.
FIG. 5 is a cross-sectional elevation of another glass mold formed in accordance with the present invention.
FIG. 6 is a cross-sectional elevation of an apparatus illustrating the method of forming a glass optical element illustrating a method in accordance with the present invention.
FIG. 7 is a cross-sectional view of a molded glass optical element in accordance with the present invention.

Referring to FIG. 1, there is shown a slug or preform 10 disposed within master sleeve 12. In opposing cooperative relationship with slug 10 is master or mold element 14. Examples of materials suitable for forming master 14 are Inconel 718, stainless steel type 420, tungsten carbide, and the like.

The molding or optical surface of the master may degrade in use through chemical attack, corrosion, denting, abrasion, adherence of the material to be molded, or the like. To minimize such degradation, the master surfaces may be coated or plated. Suitable coating and plating materials are electroless nickel (ElNi) for Inconel 718 and type 420 stainless steel, and gold for tungsten carbide. Other possible coating and plating materials are hafnium, nitride, boron carbide, and amorphous diamond.

Referring again to FIG. 1, master 14 is shown formed with a snout 18 which protrudes or extends outwardly from master 14, and has a desired optical prescription on its surface 16 when used to form molds for optical elements or lenses. A master ring 20 is disposed over and about snout 18 of the master in a manner so as to form the peripheral portion of the mold surface as will be hereinafter described in more detail. The material of master ring 20 is preferably tungsten carbide but may also be MACOR ® glass ceramic or stainless steel.

Lens design data is used to calculate the profile of surface 16 of master 14. The profile compensates for the different coefficients of thermal expansion of the lens and mold materials at the forming temperature to generate the required mold figure.

To design the profile of the master, it is necessary to start with the parameters of the ultimate optical element or lens to be formed. For purposes of this description, reference will be made to the molding of a lens although this invention is not so limited. The specific material, size, shape, geometric configuration and the like of the lens must first be defined. At least in part, these will depend on the ultimate utility of the lens.

The size and shape of the lens at its forming or molding temperature is first calculated taking the temperature coefficient of expansion and other relevant parameters of the lens and lens material into account. This provides the size and shape of the mold cavities and lens mold ring at the lens forming or molding temperature. The mold cavities and mold ring will be hereinafter described in more detail.

The size and shape of the molds, mold ring and sleeve at room temperature (20 degrees C.) is then computed from the size and shape data at forming or molding temperature as well as the relevant material or composition parameters. As will be understood by one familiar with the art, the preceding process is then repeated, as relevant, to determine the master, master ring and master sleeve size and shape at both the forming temperature and room temperature.

Usually, two molds and a lens ring are used for molding the lens. Each mold forms one lens optical surface and the peripheral flat, while the ring forms the lens barrel or the outer peripheral shape and size of the lens. As will be understood, some lenses do not require a lens flat and some lenses may be molded without a ring.

One reason for forming a two piece master, snout and master ring, is to obtain a very small blend radius on the ultimate lens. The blend radius is the radius between the curved optical portion of the lens and the peripheral flat portion. For many applications the required blend radius is smaller that the tool radius that would be used to form it. Metal cutting tools having a diamond point with a 0.030" radius work well but tools with smaller radii are expensive, unreliable, and do not have a long life. Therefore, to facilitate a more precision mold design and a small blend radius, a two piece master design is preferred. It is to be understood that when a larger blend radius may be used or such a design is otherwise desirable, the master and ring may be fabricated in one piece.

The optical cavity master shape is formed on surface 16 of snout 18 of master 14. Such surface must be fabricated with precision and is preferably formed by the single point diamond turning process (SPDT). This process is defined as using a single point on a diamond cutting tool mounted in a precise lathe to machine the surface. An example of a suitable lathe is an aspheric generator manufactured by Moore Special Tool Co.

Maintaining close dimensional tolerances on the ring thickness and snout height, such as for example plus or minus 50 millionths of an inch, allows the ultimate mold cavity and mold flat to be precisely oriented producing a relatively sharp corner as the blend radius. A clearance of approximately 0.001" is typically allowed between the outside snout diameter and the master ring inside diameter for acceptable operation. Of course, it will be understood that the tolerances described above are only typical and may be varied depending on the materials and temperatures involved, the precision of the lens desired and the utility of the lens.

Slug or preform 10 is formed with a predetermined convex surface or bump 24 as is additionally shown in FIG. 4. Bump 24 is disposed in opposing relationship with surface 16 of snout 18. Surface 16 of snout 18 together with surface 22 of master ring 20 combine to form the upper mold surface 26 including concave surface 28 of glass mold 30 as shown additionally in FIG. 5. Although surface 22 is variously described herein as flat or otherwise, it will be understood that it may contain alignment or orientation marks and the like.

After slug or preform 10 is disposed in opposing relationship to surfaces 16 and 22 of snout 18 and master ring 20 respectively within sleeve 12, pushrod 32 is brought into position within sleeve 12 in operative association with slug 10. A thermocouple, not shown, may be inserted into aperture 34 of master 14 as shown in FIG. 1 for measuring temperature of master 14.

After apparatus 35 is thus assembled in a press, not shown, it is ready to be heated by any suitable means. The means of applying pressure in the press is not critical and need only have a mounting means and a ram rod, and a pneumatic or hydraulic cylinder capable of exerting a pressure (typically about 150 psi and above) sufficient to mold the particular molding composition at its molding temperature. The mold assembly and the mold material may be heated by any suitable means preferably by an RF induction field well know in the art. Such induction heating is preferred because the master sleeve is a good susceptor, RF generators are readily available commercially, and good temperature control may be maintained. Heating and pressing may be performed in a controlled inert atmosphere, such as a nitrogen glove box, to eliminate dirt, contaminants, and oxidation of the tooling, if desired.

The material for slugs 10 and 40 is not critical and the slugs may be formed of any suitable material depending on the ultimate material to be molded, the temperatures involved, chemical compatibility and the like. One familiar with the art can select a suitable material for a particular application.

For forming a mold for the lens example described herein, a glass composition known as Schott F6 manufactured by Schott-Ruhrglas Gmbh of West Germany is suitable. This composition is about as follows on an average weight percent: $Si_2O_3$ 42.7, PbO 46.8, BaO 2.5, $Al_2O_3$ 0.1, $K_2O$ 5.4, $Na_2O$ 2.5. This glass has an annealing point of about 425° C., a strain point of about 387° C., a nominal softening point of about 591° C., and a coefficient of thermal expansion of about 9 ppm/deg. (100-300° C.).

The following is an example of a typical mold forming procedure using the Schott F6 glass described herein. The temperature of the molding apparatus 35 with slug 10 in place as hereinabove described is raised to a soaking temperature of 510° C. by means of an RF induction field. The assembly is soaked at 510° C. for about three minutes or until a thermal equilibrium of the assembly is reached. Thermal equilibrium is defined as a condition where the temperature variation across the slug is not more than about 1 degree C.

Thereafter, a force is applied to pushrod 32 as shown by arrow 36. As will be well understood, pressure may be applied by means of a hydraulic cylinder press as described above. The force produced by the cylinder is raised from about 48 lbs. to 148 lbs. in about 100 seconds, and the force is maintained for about 7 minutes while the assembly is maintained at about 510° C. Thereafter, the force is removed and the assembly is allowed to cool to about 400° C., that is a temperature at which the mold material sets up.

The assembly is then further free cooled to about 150° C. and the finished glass mold, such as that illustrated by reference numeral 30 of FIG. 5, is removed from the mold assembly. A slug such as 10 of FIG. 4 having a generally cylindrical shape with straight sidewalls is well suited for the lower or stationary mold as will be hereinafter described in more detail.

The upper or movable mold 38, as illustrated in FIG. 3, may be formed from a slug 40 having a reduced diameter between shoulders 42 to ultimately result in a glass mold 38 having raised bands 44 as shown in FIG. 3. These bands simulate the bearing bands on standard piston molds and reduce the tendency for mold sticking during subsequent optical element pressing due to slight irregularities and/or dirt in the molding sleeve. Otherwise, glass mold 38, having mold surface 46 and concave surface 48, is formed from slug 40 having bump 50 in the manner described hereinabove in connection with the formation of glass mold 30.

Although the formation of the glass molds has been described in terms of forming a pair of glass molds to be used in a cooperative relationship, it is contemplated that only one glass mold may be formed as described herein and disposed in an operative relationship, to form a molding cavity, with a mold formed by other means and made of metal, glass ceramic and the like, if and when desired. As will be understood, in such an embodiment, the advantages of employing a molded glass mold as described herein will be available only on one optical surface of the ultimate optical element formed, however, depending on the optical element and the use to which it will be placed, that may be satisfactory.

The glass molds thus formed are annealed to relieve residual stresses. Such annealing may be done using equipment and general procedures known in the art, and which vary with the composition of the materials being annealed. However, care must be taken to carefully control the annealing process thereby controlling the amount of mold shrinkage in a determinable manner as well as setting the fictive temperature.

An example of annealing the molds of the present lens example is as follows. The glass molds are placed in an annealing oven manufactured by the Blue M Electric Co. of Blue Island, IL., and the temperature is raised at a rate of about 11 C. degrees per minute until the annealing temperature of 430° C. is reached. That temperature is then maintained for about 30 minutes. The important cooling rate employed is about $-0.6$ C. degrees per minute until a temperature of about 367° C. is reached. This is then followed by cooling at a rate of about $-2$ C. degrees per minute until a temperature of about 317° C. is reached. Thereafter the molds are force cooled to room temperature. The Blue M annealing oven may be programmed for the annealing cycle.

Other examples of glass compositions suitable for glass mold forming are Corning Glass Works glass composition codes 9012, 0120, and 8355. It must be understood that selection of a suitable glass mold composition depends on many variables including, importantly, the material to be molded by such molds.

Referring now to FIG. 6 there is shown an apparatus for molding a glass optical element such as the lens 52 illustrated in FIG. 7. The molding apparatus assembly comprises a sleeve post 54 disposed on a base 56. Element sleeve 58 is disposed about sleeve post 54 and the first mold 60 is placed within sleeve 58 adjacent to sleeve post 54. The first molding surface 62, within which the molding configuration is formed, is disposed within sleeve 58 in the direction away from sleeve post 54. An element ring 64 is then disposed within sleeve 58 on the surface of mold 60. As will be understood, the inner opening of ring 64 will define the exterior configuration and size of the glass element to be molded. Inner surface 66 of ring 64 and the exposed portion of first molding surface 62, exposed within the opening in ring 64, define the size and configuration of one side and the periphery of the glass element or lens to be molded.

An element preform 68 is then disposed on the first molding surface 62 within ring 64. A second mold 70 is placed within element sleeve 58 such that the second molding surface 72 thereof comes in contact with element preform 68. As will be understood, the central portion of second molding surface 72 will ultimately form the opposite side of the glass element or lens to be molded.

A pushrod 74 is then disposed over second mold 70 by means of which a force as illustrated by arrow 76 may thereafter be applied. The force is applied to the pushrod of the mold assembly by means of a hydraulic or pneumatic cylinder well known in the art. The force could also be applied by means of dead weight or even through the weight of the mold if time is not important. It should also be understood that the present invention is described in terms of molding one glass lens or optical element but it is contemplated that multiple molding assemblies may be used at one time, wherefore, a means for applying a force to a plurality of molding assemblies simultaneously, such as a hydraulic or pneumatic cylinder with a plurality of arms to contact each molding assembly, can be used.

An lens or element preform 68 is first formed having the required volume of the ultimate lens or glass element to be formed and a surface finish suitable for forming the ultimate glass article. A spherical form for element 68 is preferred for practical and economic reasons since both the surface finish and the required volume may be readily controlled and obtained by conventional machining means which do not form part of this invention and will be readily understood.

A suitable glass composition for forming a glass lens 52 is an alkali aluminofluorophosphate optical glass having a composition as follows on a weight percent basis: $P_2O_5$ 39.2, $Na_2O$ 5.0, F 4.3, PbO 24.2, BaO 20.1, $Li_2O$ 2.0, and $Al_2O_3$ 5.2. This composition has a strain point of 330° C. A typical tolerance on the diameter of a spherical preform is plus or minus 0.008 mm and a typical finish is .LT. 1 microinch AA. Examples of other suitable compositions for forming glass optical elements are examples 10 and 13 of U.S. Pat. No. 4,447,550, as well as other $SiO_2$-$B_2O_3$-PbO-$Al_2O_3$-F type glasses. As will be understood, the composition of the ultimate optical element or lens may vary greatly depending on the use to which it may be put and/or the environment in which it is used. Therefore, the composition of the lens or optical element is not critical to and does not form part of the present invention. It will also be understood that the optical element or lens material may be other than glass, as is herein described, and may be a combination of materials or various plastics.

A suitable oven for molding glass optical elements in accordance with the present invention is an ULTRATEMP®, Model IGF 9980-4, manufactured by Blue M Electric Co. of Blue Island, IL.

Typically, the oven is purged with an inert gas, such as nitrogen or argon, prior to use to prevent oxidation of the materials, equipment and apparatus employed. Purging for about 38 minutes with nitrogen at a gas flow of about 350–400 scfh has been found to be useful.

After the molding assembly is disposed in the oven and the oven is purged, the oven heat-up cycle is started. The soaking-pressing temperature of about 375°

C. is reached in approximately 100 minutes. At the end of this heat-up soaking interval, the pressing cycle starts, typically for about 10-15 minutes, while the pressing temperature is maintained. As will be understood, the pressing temperature depends on the composition of the preform and its physical characteristics, such as the softening point. It will also be understood that the force to be applied by the pneumatic or hydraulic cylinder to the pushrod will vary with the preform material. For the alkali aluminofluorophosphate element preform material described heretofore, the pressing temperature will be 375° C.

An important consideration in forming the optical element or lens is alignment of the mold parts. Specifically, the mold centerlines should be coincident within predetermined limits for the particular application. Element sleeve 58 maintains the mold parts in alignment. A precision V-block could also be used for this purpose. The inside diameter of the element sleeve as well as all other dimensions are determined in the manner described in connection with the design of the master sleeve hereinabove. The dimensional tolerance between the outside diameter of the mold parts and the inside diameter of the sleeve are important for the desired axial alignment of the mold parts and must be determined for each application as herein described.

The element ring 64 is disposed intermediate molds 60 and 70 and aligned therewith by element sleeve 58. Ring 64 dimensions are determined as described in connection with master ring above taking into account the lens material characteristics and the ultimate lens configuration.

An important aspect of the pressing conditions selected for forming the glass optical element of the present invention is that the element thickness is self-limiting, as desired. Having formed the element preform and element ring as herein described, the process is operated in such manner as to produce an element thickness controlled by the resistance of the formed glass optical element to further deformation. That is, at a specific temperature, the pressure used will be opposed by the force required to cause physical deformation in the near final shape of the glass optical element being formed. Since the diameter is constrained by element ring 64, the resultant molded article will have a finite thickness controlled by temperature and pressure. As will be understood, the process may also be operated at temperatures and pressures such that element ring 64 is the controlling factor for the thickness of the optical element being formed.

After pressing is complete, the pressing cylinder is retracted, the oven damper opens automatically, and an 80 minute oven cooling-off period begins. The entire cycle takes approximately 4 hours with the equipment and materials described.

A typical example of forming a glass lens with glass molds is as follows. Two glass molds corresponding to 60 and 70 are provided having a desired molding surface configuration, an outside diameter of 0.6", and a length of 0.7". Also provided are an element sleeve 58 having an inside diameter of 0.6", an outside diameter of 0.8", and a length of 2.25"; an element ring 64 having an inside diameter of 0.250", an outside diameter of 0.6", and a thickness of 0.062"; and a spherical preform 68 having a radius of 2.494 plus or minus 0.0024 mm. The dimensional tolerance between the outside diameter of the molds and element ring and the inside diameter of the element sleeve is 0.0001".

The glass mold 60, fabricated by the process described earlier from said Schott F6 optical glass, is placed within tungsten carbide sleeve 58. The tungsten carbide element ring 64 is then placed on the surface of glass mold 60. Sleeve 58, glass mold 60 and element ring 64 are then placed over a type 304 stainless steel sleeve post 54 on a tool steel base 56. Spherical element preform 68, formed of the alkali aluminofluorophosphate optical glass described above, having a radius of 2.494 plus or minus 0.008 mm. and mass of 0.2470 plus or minus 0.0024 gm, is placed within the formed element ring 64. A second glass mold 70 is then placed within sleeve 58 in contact with element preform 68. A type 304 stainless steel pushrod 74 is disposed within sleeve 58 adjacent glass mold 70 thus completing a mold sub-assembly.

Additional sub-assemblies may be assembled on base 56, and also sub-assemblies may be setup on additional base units, if desired. In this manner, a large number of optical elements or lenses may be molded at one time greatly increasing productive efficiency. In such an embodiment, a plurality of arms are attached or affixed to, or otherwise operatively associated with, the pressing hydraulic or pneumatic cylinder so as to contact each sub-assembly and exert a force thereon as described herein.

The base units are placed into a ULTRATEMP® Inert Gas Oven, Model IGF-9980-4, manufactured by Blue M Electric Company of Blue Island, IL. The inert gas oven is modified to accommodate a support framework for the base units beneath a pressing rod connected to an external pneumatic cylinder. The pneumatic cylinder is Model #D-16-F-SM-UM manufactured by Bellowfram Co., SR2, Newel, W. Va. The oven is a forced gas circulation oven.

The oven is then closed and purged with $N_2$ gas for a period of about 40 min. at a flow of about 350-400 scfh. At the end of the oven purge, the $N_2$ flow is lowered to about 90-110 scfh and maintained at that level to provide an inert gas atmosphere during subsequent processing. The oven is then heated to a temperature of about 375° C. and maintained at that temperature by means of electrical heating elements.

After maintaining such temperature for about 100 minutes, the pneumatic cylinder is caused to contact the push rod; a pressure of 33 psi being applied to the cylinder. The pressure is transmitted to the mold assembly and maintained for about 10 minutes.

After pressing is completed, the cylinder pressing rod is retracted and the oven set point controller temperature is lowered to about 25° C. The oven damper is opened and external air circulation is started to allow free cooling. Such free cooling is continued for about 80 minutes, after which N2 flow to the oven is stopped. The base units are then removed from the oven and glass optical elements or lenses 52 are removed from the sub-assemblies.

Glass optical elements 52 may then be annealed, if desired, by heating to 259° C. at a rate of 2 C. degrees per minute; then heated to 329° C. at a rate of 1.15 C. degrees per minute; holding temperature at 329° C. for 5 minutes; then cooling to 225° C. at a rate of 0.86 C. degrees per minute; then cooling to 20° C. at a rate of 3.4 C. degrees per minute.

It has been found that forming the first and second glass molds in accordance with the present invention results in enormous economies and benefits for the following reasons. An ordinary metal mold has a typical expected life of about 300 cycles before it is attacked by the various chemicals involved, scratched, distorted, or otherwise made unsuitable for further precision molding. The life of the master of the present invention is approximately 30 cycles, but each glass mold formed from a master can thereafter be employed in approximately 100 molding cycles. It is seen, therefore, that employing the glass molds of the present invention to further mold glass optical elements in accordance with the present invention, a 10 fold economy is realized. That is, for each master in accordance with the present invention, approximately 3000 glass optical elements can be produced in comparison to 300 such elements produced by employing prior art metal molds.

The present invention has been particularly shown and described with reference to preferred embodiments thereof, however, it will be understood by those skilled in the art that various changes in the form and detail may be made therein without departure from the true spirit and scope of the invention as defined by the following claims.

We claim:

1. The method of molding a glass optical element having first and second opposed optical surfaces comprising the steps of
    providing a first master defining a first master mold cavity adapted to form a first glass mold,
    disposing a first quantity of glass mold material within said first master mold cavity,
    molding a first glass mold having a first glass molding surface adapted to form said first optical surface,
    providing a second master defining a second master mold cavity adapted to form a second glass mold,
    disposing a second quantity of glass mold material within said second master mold cavity,
    molding a second glass mold having a second glass molding surface adapted to form a second optical surface,
    disposing said first and second glass molds in opposed cooperative relationship such that said first and second glass molding surfaces in part define a glass mold cavity having a predetermined volume,
    disposing a predetermined quantity of glass optical element material within said glass mold cavity, and
    molding said glass optical element having first and second opposed optical surfaces.

2. The method of claim 1 wherein said glass optical element material is an alkali aluminofluorophosphate glass.

3. The method of claim 1 wherein said quantity of glass optical element material comprises a sphere.

4. The method of claim 1 further comprising the step of heating said glass optical element material to the softening temperature thereof.

5. The method of claim 1 further comprising the step of disposing an element ring between said first and second glass molds whereby the outside diameter of said glass mold cavity is defined by the inside diameter of said ring.

6. The method of claim 1 further comprising the steps of
    providing a constraining means, and
    disposing said first and second glass molds in opposing operative relationship within said means.

7. The method of claim 6 wherein said constraining means is a sleeve.

8. The method of claim 1 wherein said step of molding said optical element further comprises applying a force to the assembly so formed.

9. The method of claim 1 further comprising the steps of
    providing a plurality of pairs said first and second glass molds in opposed cooperative relationship such that each said first and second glass molding surfaces in part define a glass mold cavity having a predetermined volume, size and shape,
    disposing a predetermined quantity of glass optical element material within each said glass mold cavity, and
    molding a plurality of glass optical elements each having first and second opposed optical surfaces.

10. The method of claim 9 further comprising the steps of
    providing an oven,
    disposing said plurality of pairs of glass molds and said quantities of glass optical element materials in said oven, and
    heating said molds and said quantities of material.

11. The method of claim 10 further comprising the step of applying a force to each said pair of molds to mold said optical element material.

12. The method of claim 10 further comprising the step of maintaining an inert gas atmosphere in said oven during said molding step.

13. The method claim 12 wherein said inert gas is nitrogen.

14. The method of claim 10 further comprising the step of soaking the quantities of optical element material at the molding temperature until thermal equilibrium reached before said molding step.

15. The method of claim 14 wherein said heating is performed by means of an RF induction field.

16. The method of claim 15 further comprising the step of annealing said glass optical elements.

17. The method of claim 9 further comprising the steps of
    providing an oven,
    providing an inert gas atmosphere within said oven,
    disposing said plurality of first and second glass molds and said quantities of optical element material in said oven,
    heating said molds and said quantities of material to the molding temperature of said material,
    maintaining said inert atmosphere within said oven,
    soaking the quantities of optical element material at said molding temperature until thermal equilibrium is reached,
    applying a force to each pair of molds to mold said material into optical elements, and
    thereafter annealing said optical elements.

18. The method of claim 17 wherein each said quantity of material comprises a sphere.

19. The method of claim 1 further comprising the step of annealing the glass optical elements.

20. The method of claim 1 further comprising the steps of
    providing an oven,
    providing an inert gas atmosphere within said oven,
    disposing said first and second glass molds and said quantity of optical element material in said oven,
    heating said molds and said quantity of material to the molding temperature of said material,
    maintaining said inert atmosphere within said oven, soaking the quantity of optical element material at said molding temperature until thermal equilibrium is reached, applying a force to said molds to mold said material into an optical element, and thereafter annealing said optical element.

21. The method of claim 20 wherein said quantity of material comprises a sphere.

22. The method of molding a glass optical element having first and second opposed optical surfaces comprising the steps of:

providing a master defining a master mold cavity adapted to form a first glass mold, disposing a quantity of glass mold material within said master mold cavity, molding a first glass mold within said master mold cavity having a first glass molding surface adapted to form said first optical surface, providing a second mold having a second molding surface, disposing said first and second molds in opposed cooperative relationship such that said first and second molding surfaces in part define a mold cavity, with at least one glass molding surface, having a predetermined volume, disposing a predetermined quantity of moldable optical element material within said mold cavity, and molding said optical element having first and second opposed optical surfaces.

23. The method of claim 22 wherein said quantity of optical element material comprises a glass sphere.

24. The method of claim 22 further comprising the step of heating a glass optical element material to the softening temperature thereof.

25. The method of claim 22 further comprising the steps of providing a sleeve-type constraining means, and disposing said first and second molds in opposing operative relationship within said means.

26. A method of claim 25 further comprising the step of disposing an element ring within said constraining means between said first and second molds whereby the outside diameter of said mold cavity is defined by the inside diameter of said ring, and whereby the outside diameter of said ring is constrained by said constraining means.

27. The method of claim 26 wherein said step of molding said optical element further comprises applying a force to the assembly so formed.

28. The method of claim 22 further comprising the steps of providing a plurality of pairs said first and second molds in opposed cooperative relationship such that each said first and second molding surfaces in part define a mold cavity having a predetermined volume, size and shape, disposing a predetermined quantity of glass optical element material within each said mold cavity, and molding a plurality of optical elements each having first and second opposed optical surfaces.

29. The method of claim 28 further comprising the steps of providing an oven, disposing said plurality of pairs of molds and said quantities of optical element materials in said oven, and heating said molds and said quantities of material.

30. The method of claim 29 further comprising the step of applying a force to each said pair of molds to mold said optical element material.

31. The method of claim 29 further comprising the step of maintaining an inert gas atmosphere in said oven during said molding step.

32. The method claim 31 wherein said inert gas is nitrogen.

33. The method of claim 28 further comprising the steps of providing an oven, providing an inert gas atmosphere within said oven, disposing said plurality of first and second molds and said quantities of glass optical element material in said oven, heating said molds and said quantities of material to the molding temperature of said material, maintaining said inert atmosphere within said oven, soaking the quantities of optical element material at said molding temperature until thermal equilibrium is reached, applying a force to each pair of molds to mold said material into optical elements, and thereafter annealing said optical elements.

34. The method of claim 33 wherein each said quantity of material comprises a glass sphere.

35. The method of claim 22 wherein said optical element material is glass and further comprising the step of annealing the glass optical elements.

36. The method of claim 35 wherein said quantity of material comprises a glass.

37. The method of claim 22 further comprising the steps of providing an oven, providing an inert gas atmosphere within said oven, disposing said first and second molds and a quantity of glass optical element material in said oven, heating said molds and said quantity of material to the molding temperature of said material, maintaining said inert atmosphere within said oven, soaking the quantity of optical element material at said molding temperature until thermal equilibrium is reached, applying a force to said molds to mold said material into a glass optical element, and thereafter annealing said optical element.

38. The method of molding a glass optical element having first and second opposed optical surfaces comprising the steps of:

providing a master defining a master mold cavity adapted to form a first glass mold, disposing a quantity of glass mold material within said master mold cavity, molding a first glass mold having a first glass molding surface adapted to form said first optical surface, providing a second mold having a second molding surface, disposing said first and second molds in opposed cooperative relationship such that said first and second molding surfaces in part define a mold cavity having a predetermined volume, disposing a predetermined quantity of an alkali aluminofluorphosphate glass optical element material within said mold cavity, and molding said optical element having first and second opposed optical surfaces.

39. The method of molding a glass optical element having first and second opposed optical surfaces comprising the steps of:
provapping a master defining a master mold cavity adapted to form a first glass mold,
disposing a quantity of glass mold material within said master mold cavity,
molding said first glass mold having a first glass molding surface adapted to form said first optical surface,
providing a second mold having a second molding surface,
providing a plurality of pairs of said first and second molds in opposed cooperative relationship such that each said first and second molding surfaces in part defines a mold cavity having a predetermined volume, size and shape,
disposing a predetermined quantity of glass optical element material within each said mold cavity,
molding a plurality of glass optical elements each having first and second opposed optical surfaces,
providing an oven, disposing said plurality of pairs of molds and said quantities of optical element materials in said oven, heating said molds and said quantities of material by means of an RF induction field, and
soaking the quantities of optical element material at the molding temperature until thermal equilibrium is reached before said molding step.

40. The method of claim 39 further comprising the step of annealing said optical elements.

* * * * *